US010448283B2

(12) United States Patent
Bongaarts et al.

(10) Patent No.: US 10,448,283 B2
(45) Date of Patent: Oct. 15, 2019

(54) DYNAMIC PREDICTIVE BUFFERING (71) Applicant: T-Mobile USA, Inc., Bellevue, WA (US)

(72) Inventors: Paul Bongaarts, Issaquah, WA (US); Jeffery A. Smith, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/671,057

(22) Filed: Aug. 7, 2017

(65) Prior Publication Data
US 2019/0045399 A1 Feb. 7, 2019

(51) Int. Cl.
| H04W 72/00 | (2009.01) |
| H04L 1/00 | (2006.01) |
| G06F 15/16 | (2006.01) |
| H04W 28/18 | (2009.01) |
| H04W 28/14 | (2009.01) |
| H04L 12/911 | (2013.01) |
| H04L 12/835 | (2013.01) |
| H04N 21/61 | (2011.01) |
| H04N 21/647 | (2011.01) |
| H04W 72/04 | (2009.01) |
| G06F 11/07 | (2006.01) |
| H04W 36/02 | (2009.01) |

(52) U.S. Cl.
CPC ............ H04W 28/18 (2013.01); H04L 47/30 (2013.01); H04L 47/823 (2013.01); H04N 21/6137 (2013.01); H04N 21/64738 (2013.01); H04W 28/14 (2013.01); G06F 11/07 (2013.01); H04W 36/023 (2013.01); H04W 72/0433 (2013.01)

(58) Field of Classification Search
CPC ... H04W 28/14; H04W 28/18; H04W 36/023; H04W 72/0433; H04L 47/823; G06F 11/07
USPC ........................................................ 455/453
See application file for complete search history.

(56) References Cited

U.S. PATENT DOCUMENTS

| 6,750,813 | B2 | 6/2004 | Vargas-Hurlston et al. |
| 7,203,487 | B2* | 4/2007 | Comp ................... H04W 8/005 455/226.2 |
| 2005/0207437 | A1* | 9/2005 | Spitzer .................... H04L 12/66 370/412 |
| 2006/0077994 | A1* | 4/2006 | Spindola ................ H04J 3/0632 370/412 |
| 2009/0245118 | A1 | 10/2009 | McCormick |
| 2010/0029263 | A1* | 2/2010 | Senoo ................... H04W 48/18 455/423 |
| 2010/0203881 | A1 | 8/2010 | Romero et al. |

(Continued)

OTHER PUBLICATIONS

International Search Report and Written Opinion for PCT Application No. PCT/US2018/045286, dated Nov. 23, 2018, 12 pages.

Primary Examiner — Rafael Pérez-Gutiérrez
Assistant Examiner — Mark G. Pannell
(74) Attorney, Agent, or Firm — Han Santos, PLLC (57) ABSTRACT Buffering streaming content includes accessing prior device location data of a device and predicting a future sector that the device will travel through based at least in part on the prior device location data. A predicted quality of service of wireless communications is determined and a streaming buffer is adjusted based at least in part on the predicted quality of service.

18 Claims, 7 Drawing Sheets (56) References Cited

U.S. PATENT DOCUMENTS

| | | | | |
|---|---|---|---|---|
| 2010/0330988 | A1* | 12/2010 | Granlund | H04W 48/10 |
| | | | | 455/434 |
| 2013/0322365 | A1* | 12/2013 | Garcia Martin | H04W 72/048 |
| | | | | 370/329 |
| 2014/0022919 | A1* | 1/2014 | Dwivedi | H04W 36/30 |
| | | | | 370/252 |
| 2014/0157142 | A1* | 6/2014 | Heinrich | H04L 67/1095 |
| | | | | 715/744 |
| 2015/0049602 | A1* | 2/2015 | Gavita | H04W 28/0268 |
| | | | | 370/229 |
| 2015/0120087 | A1 | 4/2015 | Duan et al. | |
| 2015/0350276 | A1* | 12/2015 | Karlsson | H04L 65/60 |
| | | | | 709/231 |
| 2017/0180275 | A1 | 6/2017 | Krinsky | |
| 2017/0208434 | A1* | 7/2017 | Shenhav | H04W 4/021 |

\* cited by examiner

DYNAMIC PREDICTIVE BUFFERING

BACKGROUND

In conventional wireless carrier networks, wireless data is transmitted from an antenna (e.g., cellular radio tower) to a user device. When data continuity is desirable such as in video or audio streaming, the data may be buffered so that a slight disruption or delay in wireless data service does not affect the playback of the video or audio data on the user device.

However, existing buffering techniques utilize a static or fixed buffer even when interruptions or delays in wireless data service may exceed the buffer size and consequently cause a noticeable disruption in wireless data service. For example, when a user streaming video data on a user device encounters a disruption in service, they will experience a stoppage in the video the user was watching. Thus, existing buffering techniques in wireless data communication are susceptible to disruptions in the user experience as the user device moves between network zones of differing service quality.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to dynamic predictive buffering in a wireless carrier network. Embodiments of the disclosure may include both predicting a future sector that a device will travel through (e.g., based on prior device location data) and predicting a quality of service ("QoS") of wireless communications from a wireless carrier network in the future sector. The future sector prediction may include analyzing historical device mobility behavior based on both time and location data (i.e., from a global navigation satellite system ("GNSS")). The future sector QoS may include analyzing historical quality of service data for the future sector. For example, if a user's daily drive from home to work includes an area of known lower quality wireless coverage, and time/location data from a user device indicates that the user is driving from home to work, then it is likely they will encounter the known area of lower quality wireless coverage.

In embodiments of the disclosure, the buffer of content streamed to the user device may be adjusted when a future predicted QoS of wireless communication from a wireless carrier network might be different. In one embodiment, an additional buffer allocation is granted to the user device. This increase of the buffer occurs when both the predicted QoS of the wireless communication from the wireless carrier network in the future sector is below a threshold level, and when the existing QoS for the wireless carrier network is above a minimum threshold level (i.e., the current QoS is more favorable than the predicted future QoS). In one embodiment, adjusting the buffer includes decreasing the buffer allocation when the predicted QoS in the future sector is superior to the existing QoS. Therefore, a streaming buffer can be adjusted using dynamic predictive buffering to limit interruptions in streaming data when inferior QoS is predicted while also maintaining network efficiency when the predicted quality of service is sufficient to maintain a user's streaming experience.

In one illustrative example, if a user's daily commute to school includes a subway, historical device location data specific to the user's device may be utilized to predict a disruption in service when the user takes the subway. As such, the streaming buffer of the user device may be temporarily increased to hold more content (e.g., video data of a movie that the user is streaming) to preserve the user's experience.

The techniques described herein may be implemented in a number of ways. Example implementations are provided below with reference to the following FIGS. 1-7.

Figure 1:
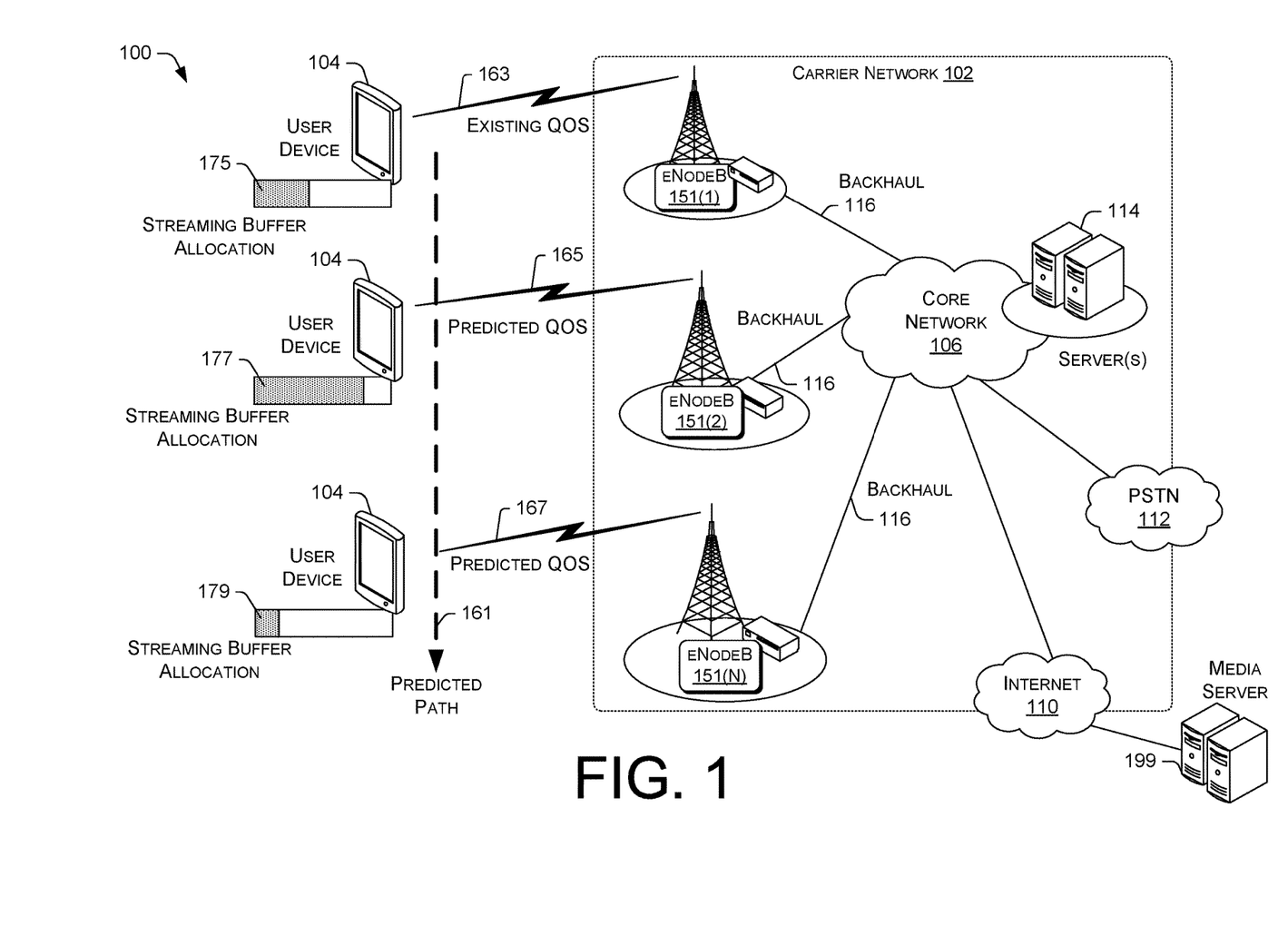
FIG. 1 illustrates an example architecture including a user device receiving data from a carrier network with a dynamic buffer allocation.

FIG. 1 illustrates an example architecture 100 including a user device 104 receiving data from a carrier network 102. Carrier network 102 may facilitate cellular data communication such as voice calls, texts, and data. Example cellular data standards implemented by carrier network 102 for cellular data communications may include Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth. Example carrier network 102 includes a core network 106 that may provide telecommunication and data communication services to the user device 104. For example, the core network 106 may connect the user devices (via base stations and backhaul 116) to other telecommunication and data communication networks, such as the Internet 110 and the public switched telephone network (PSTN) 112. In various embodiments, the core network 106 may include one or more servers 114 that implement network components. For example, the network components may include a serving GPRS support node (SGSN) that routes voice calls to and from the PSTN 112, a Gateway GPRS Support Node (GGSN) that handles the routing of data communication between external packet switched networks and the core network 106. The network components may further include a Packet Data Network (PDN) gateway (PGW) that routes data traffic between the GGSN and the Internet 110. The network components may also include an Operations Support System (OSS) platform for managing network configuration, fault management, and provisioning of wireless carrier network 102.

The wireless carrier network 102 may also include a radio access network including multiple base stations. The multiple base stations are responsible for handling voice and data traffic between multiple user devices, such as the user device 104, and the core network 106. In the illustrated embodiment of FIG. 1, the base stations are in the form of eNodeB nodes 151. Each eNodeB node 151 may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive radio signals from user devices to facilitate wireless communication. Each eNodeB node 151 may be connected to core network 106 via backhaul connection 116, as illustrated.

In the illustrated embodiment, carrier network 102 may access media stored on media servers 199 via the Internet 110. In an example, carrier network 102 facilitates streaming audio data from an album stored on media server 199 to user device 104. In one example, carrier network 102 facilitates streaming video data from a movie or television series stored on media server 199 to user device 104. In one embodiment (not illustrated), a content distribution network (CDN) is included in carrier network 102 and streaming media may be stored in the CDN. In this embodiment, carrier network 102 may facilitate the streaming of the media from the CDN to the user device(s) 104. Those skilled in the art appreciate that CDNs may be implemented as servers to provide media content to users based on the geographic location of the user and reduce latency.

User device 104 may be a smartphone, a tablet computer, an embedded computer system, or any other device that is capable of using the wireless communication services that are provided by the carrier network 102. In the illustrated embodiment, user device 104 is connected to eNodeB 151(1) at an existing quality of service (QOS) 163 with a streaming buffer allocation 175. As user device 104 moves among different cells in carrier network 102, the streaming buffer allocation 175 may change to streaming buffer allocation 177 or 179, for example, based on a predicted QOS 165 or 167 corresponding to a predicted path 161 of the user device 104. Wireless networks are subject to quality degradation under a variety of conditions. These conditions may include: low signal strength, poor signal to noise ratio, interference, etc. This disclosure uses the terminology "quality of service" ("QoS") to refer to a qualitative or quantitative measure of the user experience, as a result of the wireless network conditions.

In FIG. 1, while user device 104 has access to an existing QOS 163 provided by eNodeB 151(1), the streaming buffer allocation 175 for user device 104 is above a standard streaming buffer allocation because a predicted QOS 165 that the user device 104 will encounter is known to be below an average quality of service. For ease of description, a "below average" quality of service may be referred to as "level 2" throughout this disclosure, although many levels of QOS specificity may be implemented. The predicted QOS 165 may be predicted based on a predicted path 161 of user device 104, which may be derived from prior device location data of user device 104. In other words, the streaming buffer allocation 175 has been increased beyond a standard streaming buffer allocation because the predicted QOS of eNodeB 151(2) is below average (level 2). Increasing the streaming buffer allocation for user device 104 may maintain the streaming experience for a user of user device 104 while the user device 104 moves through a sector having a less than ideal QOS, such as the level 2 QOS provided by eNodeB 151(2).

Also in FIG. 1, while user device 104 has access to QOS 165 provided by eNodeB 151(2), the streaming buffer allocation 177 for user device 104 is well above a standard streaming buffer allocation because a predicted QOS 167 that the user device 104 will encounter is known to be a significantly below average quality of service. For ease of description, a "significantly below average" quality of service may be referred to as "level 1" throughout this disclosure, although many levels of QOS specificity may be implemented.

Still referring to FIG. 1, while user device 104 has access to QOS 167 provided by eNodeB 151(N), the streaming buffer allocation 179 for user device 104 drops back down to a standard streaming buffer allocation because a predicted QOS (not illustrated) that the user device 104 will encounter along predicted path 161 is known to be sufficient to sustain a streaming experience for user device 104.

Figure 2:
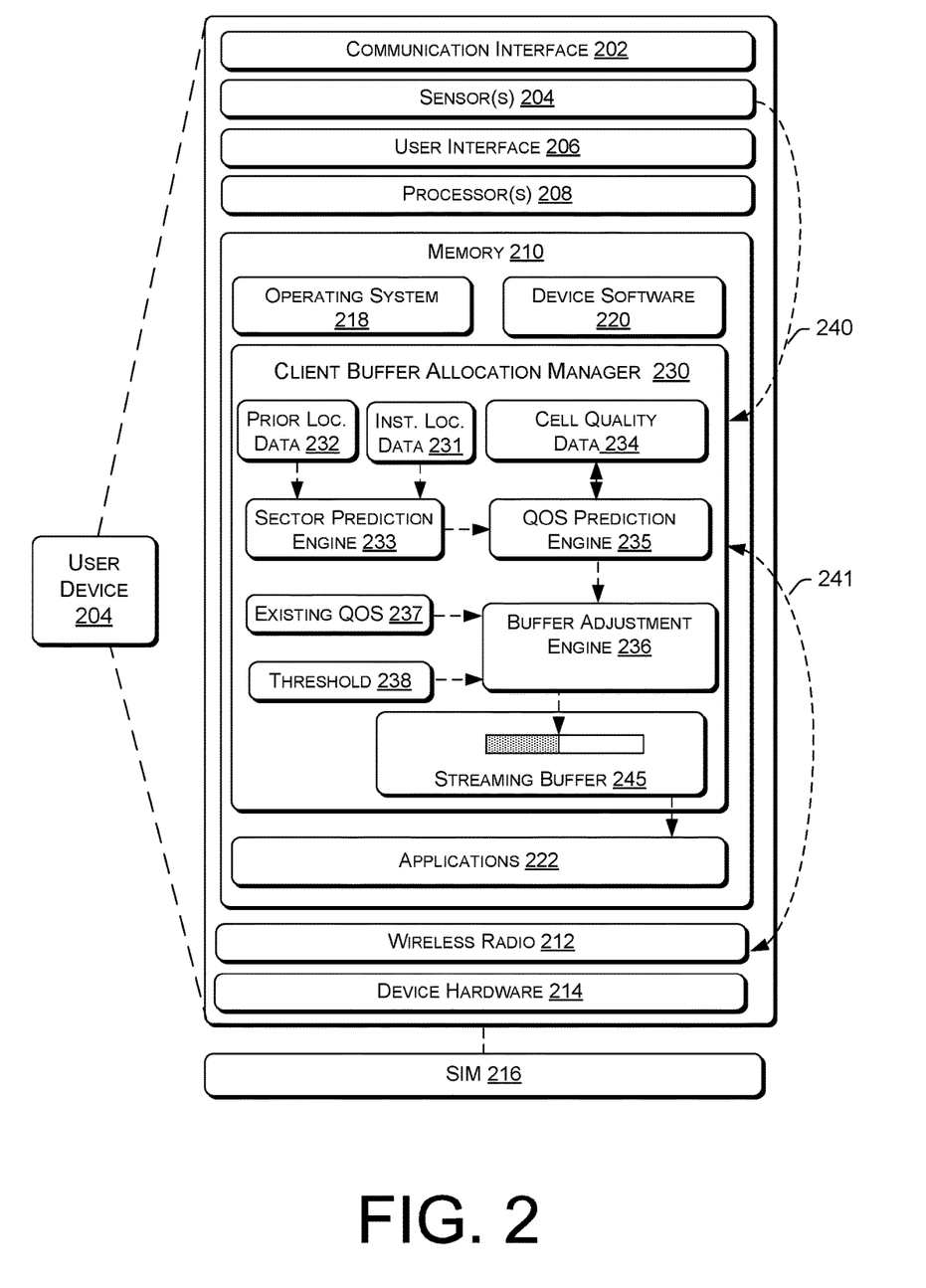
FIG. 2 is a block diagram showing various components of an example user device that is configured to adjust a buffer allocation based at least in part on a predicted quality of service of a predicted future sector that the user device will encounter.

FIG. 2 is a block diagram showing various components of an example user device 204 that is configured to adjust a streaming buffer allocation based at least in part on a predicted quality of service of a predicted future sector that the user device will encounter. User device 204 is one illustrative example of user device 104. The user device 204 may include a communication interface 202, one or more sensors 204, a user interface 206, one or more processors 208, and memory 210. The communication interface 202 may include wireless and/or wired communication components that enable the electronic device to transmit or receive voice or data communication via the wireless carrier network 102, as well as other telecommunication and/or data communication networks. The sensors 204 may include a proximity sensor, a compass, an accelerometer, altimeter, cameras, and/or a global positioning system (GPS) sensor. The compass, the accelerometer, and the GPS sensor may detect orientation, movement, and geolocation of the user device 204.

The user interface 206 may enable a user to provide inputs and receive outputs from the user device 204. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The user device 204 may also include wireless radio 212 and other device hardware 214. The wireless radio 212 may include hardware components that enable the user device 204 to perform telecommunication and data communication with carrier network 102, Wi-Fi networks, and/or Bluetooth enabled devices. The device hardware 214 may include other hardware that is typically located in a mobile telecommunication device. For example, the device hardware 214 may include signal converters, transceivers, antennas, hardware decoders and encoders, graphic processors, a SIM card slot, and/or the like that enable the user device 204 to execute applications and provide telecommunication and data communication functions. The SIM 216 may be an integrated circuit chip that is inserted into the SIM card slot of the user device 204, or an embedded SIM that is hardwired into the circuit board of the user device 204.

The one or more processors 208 and the memory 210 of the user device 204 may implement an operating system 218, device software 220, and/or one or more applications 222. The various software and applications may include routines, program instructions, objects, and/or data structures that perform particular tasks or implement particular abstract data types. The operating system 218 may include components that enable the user device 204 to receive and transmit data via various interfaces (e.g., user controls, communication interface 202, and/or memory input/output devices). The operating system 218 may also process data using the one or more processors 208 to generate outputs based on inputs that are received via the user interface 206. For example, the operating system 218 may provide an execution environment for the execution of the applications 222. The operating system 218 may include a presentation component that presents the output (e.g., display the data on an electronic display, store the data in memory, transmit the data to another electronic device, etc.).

The operating system 218 may include an interface layer that enables applications to interface with the wireless radios 212 and/or the communication interface 202. The interface layer may comprise public APIs, private APIs, or a combination of both public APIs and private APIs. Additionally, the operating system 218 may include other components that perform various other functions generally associated with an operating system. The device software 220 may include software components that enable the user device to perform functions. For example, the device software 220 may include basic input/output system (BIOS), Boot ROM, or a bootloader that boots up the user device 204 and executes the operating system 218 following power up of the device.

The applications 222 may include applications that provide utility, entertainment, and/or productivity functionalities to a user of the user device 204. For example, the applications 222 may further include electronic mail applications, remote desktop applications, web browser applications, navigation applications, office productivity applications, audio streaming applications, video streaming applications, and/or so forth.

Memory 210 includes client buffer allocation manager 230. In the illustrated embodiment, client buffer allocation manager 230 includes prior device location data 232, instant device location data 231, sector prediction engine 233, cell quality data 234, a QOS Prediction Engine 235, Existing QOS data 237, threshold data 238, buffer adjustment engine 236, and streaming buffer 245. In FIG. 2, the calculation of the streaming buffer is performed by the user device 204.

Prior device location data 232 may include locations of the user device 204 and the times that the user device 204 was at the locations. Client buffer allocation manager 230 may receive locations and/or corresponding time stamps of the user device from sensors 204 via location link 240. The locations may be derived from GPS sensors or compasses of sensors 204. Client buffer allocation manager 230 may also receive prior device location data 232 from servers 114 of carrier network 102 via wireless radios 212 and data link 241 in some embodiments. Hence, the prior device location data 232 may include hundreds or thousands of prior device locations with corresponding times. In an embodiment, the prior device location data 232 includes at least a first pairing and a second pairing, where the first pairing including a first location and a first time that a device was at the first location and the second pairing including a second location and second time that the device was at the second location.

Instant device location data 231 may include the instant location (and time) of the user device. The instant location of the user device may be derived from a GPS sensor of the user device or a Wi-Fi signal that is received by the user device that can be mapped to a location, for example.

Figure 6:
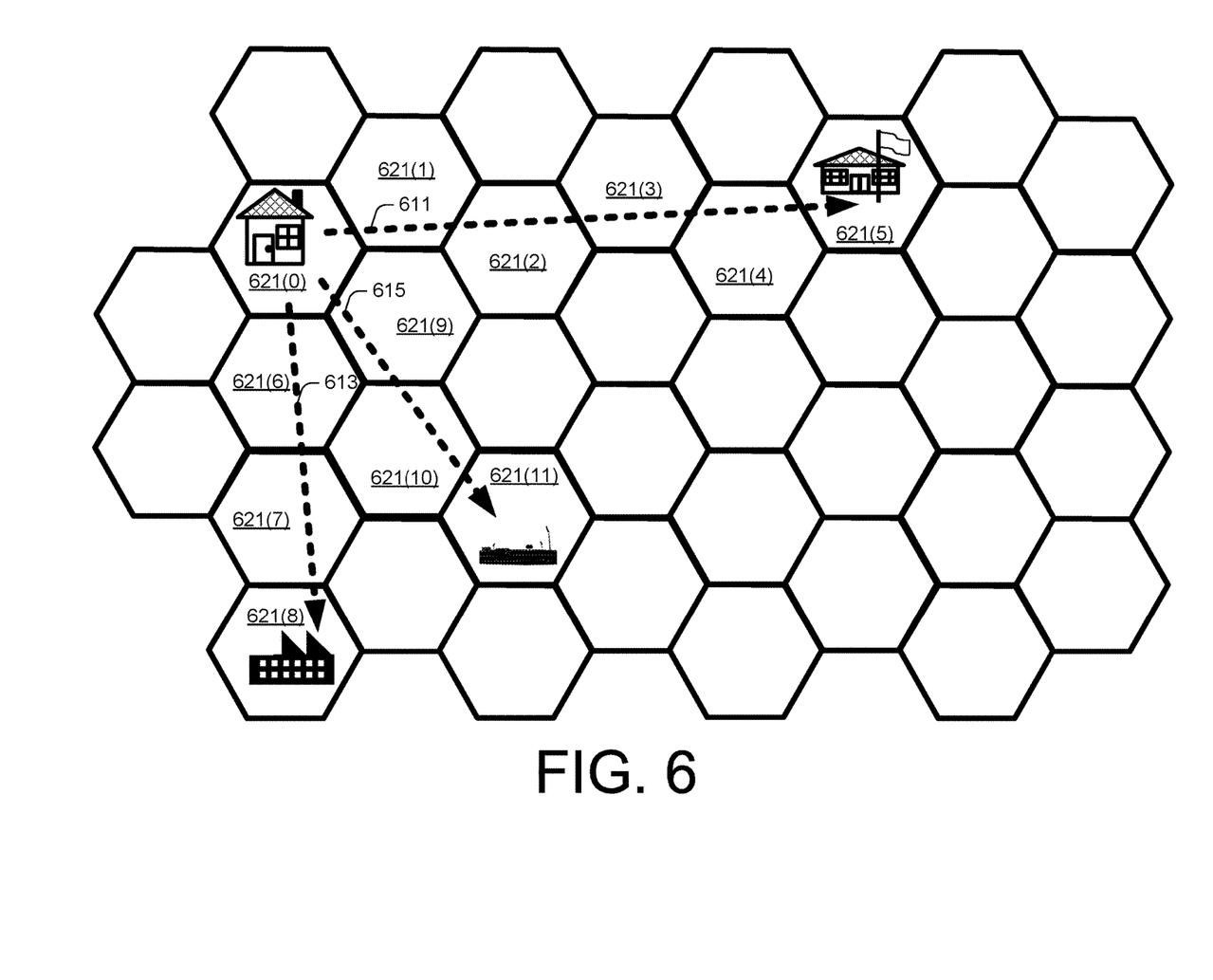
FIG. 6 illustrates example device paths through different sectors having different qualities of service.

Sector prediction engine 233 is coupled to receive prior device location data 232 and instant device location data 231 and provide predicted sector data to QOS prediction engine 235 based at least in part on the prior device location data 232 and the instant device location data 231. Referring now to FIG. 6, a user device may generally travel from a home of a user in sector 621(0) to work in sector 621(8) on Monday, Wednesday, and Friday mornings taking path 613. On Tuesdays and Thursdays afternoons, a user device may generally travel from a home of a user in sector 621(0) to school in sector 621(5) taking path 611. Prior device location data 232 may include a data log that reflects the user's habit to travel with a user device (e.g., 104/204) along path 613 on Monday, Wednesday, and Friday mornings and to travel path 611 on Tuesday and Thursday afternoons. Path 611 travels through sectors 621(0), 621(1), 621(2), 621(3), 621(4), and 621(5) and path 613 travels through sectors 621(0), 621(6), 621(7), and 621(8).

Having access to both prior device location data 232 and instant device location data 231, sector prediction engine 233 may predict that a user device will travel through sector 621(7) when the user device has already travelled through sector 621(0) and 621(6) on a Monday morning. Hence, sector prediction engine 233 may pass sector 621(7) to QOS prediction engine 235 as sector prediction data, in that example. Similarly, sector prediction engine 233 may predict that a user device will travel through sector 621(2) when the user device has already travelled through sector 621(0) and 621(1) on a Tuesday afternoon. Hence, sector prediction engine 233 may pass sector 621(2) to QOS prediction engine 235 as sector prediction data, in that example.

FIG. 6 also illustrates a user device traveling along path 615 through sectors 621(0), 621(9), 621(10), and 621(11) from the user's home to a sporting event at a stadium. Even if the user device rarely, or has never travelled along path 615, sector prediction engine 233 may still predict that the user device will encounter sector 621(10) based on the direction of travel established by the vector formed by travelling from sector 621(0) to 621(9). Hence, even a limited amount of prior device location data 232 may be useful to predict a sector that will be encountered by a user device.

Returning to FIG. 2, QOS prediction engine 235 receives the sector prediction data from sector prediction engine 233. Using the sector prediction data, the QOS prediction engine 235 may query cell quality data 234 to receive a quality of service metric data for a "cell" that provides wireless coverage to the future sector predicted by the sector prediction engine 233. Cell quality data 234 may include a table of cell identifiers with their corresponding Key Performance Indicators (KPIs). Based on the sector prediction data and the quality of service metric, QOS prediction engine 235 may determine a predicted quality of service of wireless communications from a wireless carrier network in the future sector and pass the predicted quality of service to buffer adjustment engine 236. A "sector" may be defined as a physical location such as a GPS coordinate. One or more "cells" of a wireless carrier network may provide coverage to a sector.

In FIG. 2, buffer adjustment engine 236 receives existing QOS data 237, threshold level of service quality 238, and the predicted quality of service from sector prediction engine 235. The existing QOS data 237 may be determined by receiving QOS data from wireless radio 212 via data link 241.

In one embodiment, the buffer adjustment engine 236 adjusts the streaming buffer 245 based at least in part on the predicted quality of service of the wireless communication from the wireless carrier network in the future sector. If the predicted quality of service in the future sector is significantly below average (level 1), increasing the streaming buffer 245 to buffer the streaming content onto the user device 204 prior to experiencing level 1 QOS may be useful to prevent disruption to the streaming content. If the predicted quality of service in the future sector is excellent (e.g., level 5), increasing the streaming buffer may not be necessary since the excellent QOS in the future sector is unlikely to disrupt the streaming experience. If the predicted quality of service in the future sector is excellent (level 5), the streaming buffer may be decreased for network efficiency purposes. When the streaming buffer 245 is adjusted, user device 204 may communicate the adjustment to wireless carrier network 102.

In one embodiment, adjusting streaming buffer 245 includes adjusting a high-water mark and a low-water mark in a read-ahead buffer of memory 210. The high-water mark and a low-water mark in the read-ahead buffer may be set with regard to memory size or with regard to the seconds of media content that will be read ahead.

In one embodiment, the buffer adjustment engine 236 increases streaming buffer 245 by an additional buffer allocation when the predicted quality of service of the wireless communication from the wireless carrier network in the future sector is below the threshold level of service quality 238 and the existing QOS from the wireless carrier network is above the threshold level of service quality 238. In one particular illustrative example, the predicted quality of service in the predicted future sector is "significantly below average" (level 1) and the existing QOS 237 is average (level 3). Therefore, it would be potentially advantageous to take advantage of the existing quality of service (level 3) to stream media content to a user device prior to entering the predicted quality service that is significantly below average (level 1) so that the streaming experience is not interrupted. However, if a user device is simply moving from an excellent QOS (level 5) to an above average QOS (level 4), increasing the streaming buffer 245 may not be necessary because no disruption in streaming service would be expected/predicted. Therefore, buffer adjustment engine 236 may only increase streaming buffer 245 when the QOS of the predicted sector is below a threshold level of service 238 (e.g., level 2) and the existing QOS is at or above the threshold level, in one embodiment.

Figure 3:
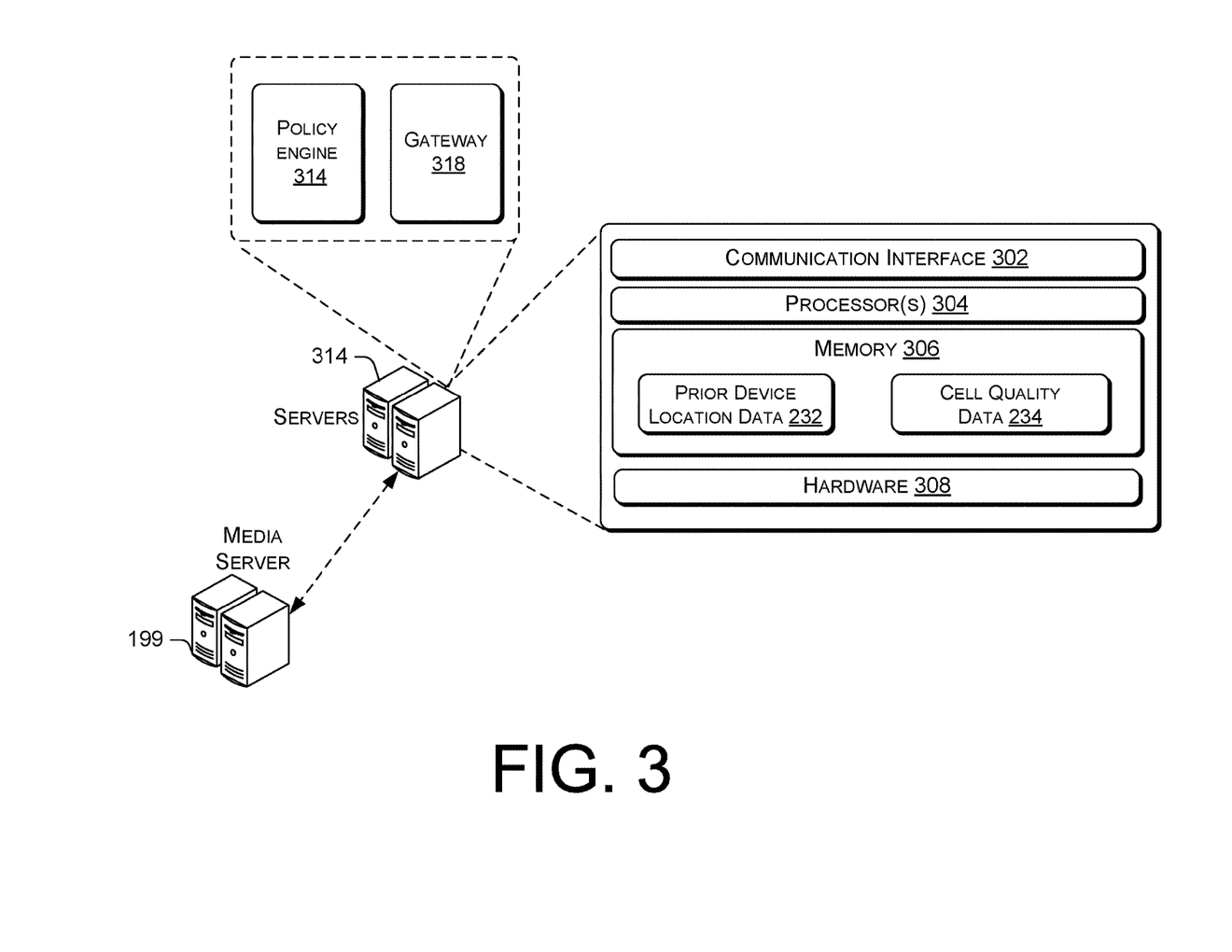
FIG. 3 is a block diagram showing various components of an example server within a carrier network that is configured to collect and store data for facilitating adjusting a buffer allocation based at least in part on a predicted quality of service of a predicted future sector that the user device will encounter.

FIG. 3 is a block diagram showing various components of an example server(s) 314 within carrier network 102 that is configured to collect and store data for facilitating adjusting a buffer allocation of streaming buffer 245 based at least in part on a predicted quality of service of a predicted future sector that the user device will encounter. FIG. 2 and FIG. 3 may illustrate an embodiment where a user device performs a significant portion of the operations and analysis to adjust a buffer allocation of streaming buffer 245 and server 314 provides data to user device 204 to support the operation and analysis. In contrast, FIG. 4 may illustrate an embodiment where a server 414 perform the majority of the operation and analysis to determine a buffer allocation to a streaming buffer, which leverages the power and processing resources of the server.

In FIG. 3, server(s) 314 may include a communication interface 302, one or more processors 304, memory 306, and hardware 308. The communication interface 302 may include wireless and/or wired communication components that enable the server(s) 314 to transmit data to and receive data from other networked devices. The hardware 308 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 306 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In various embodiments, the processors 304 and the memory 306 of the server(s) 314 may execute a policy engine 314, a gateway 318, as well as other components of the core network 106. Server(s) 314 may have access to media servers 199 to provide streaming content to user devices 104/204.

In the illustrated embodiment, memory 306 includes prior device location data 232 and cell quality data 234. In one embodiment, Key Performance Indicators (KPIs) of performance and coverage of carrier network 102 are collected by the OSS of the carrier network 102 and the KPIs may be included in cell quality data 234. Each different user device on carrier network 102 may contribute to reporting the KPIs to carrier network 102. Thus, carrier network 102 may maintain cell quality data 234 for each cell in the carrier network 102 and the cell quality data 234 may be accessed by user device 204 for purposes of determining a predicted QOS in a future sector that is provided coverage by a given cell in carrier network 102. Prior device location data 232 may also be stored in memory 306 and all or a portion of prior device location data 232 may be provided to user device 204 for purposes of determining a predicted QOS in a future sector that is provided coverage by a given cell in carrier network 102. In one embodiment, prior device location data 232 and cell quality data 234 are made available through an Application Programming Interface (API) to the user device 104.

In one embodiment, the user device 204 sends server 314 a cell identifier that identifies the cell that is currently providing cellular service to the user device. User device 204 may also send the server 314 an N−1 cell identifier and an N−2 cell identifier, where N is the current cell, N−1 is the previous cell to provide cellular service, and N−2 is the cell prior to N−1 that provided cellular service to user device 204. Server 314 may respond with providing to the user device 204 all the neighboring cells and their neighbors along with the cell quality data 234 of each of the neighboring cells and/or the neighbors of the neighboring cells.

Figure 4:
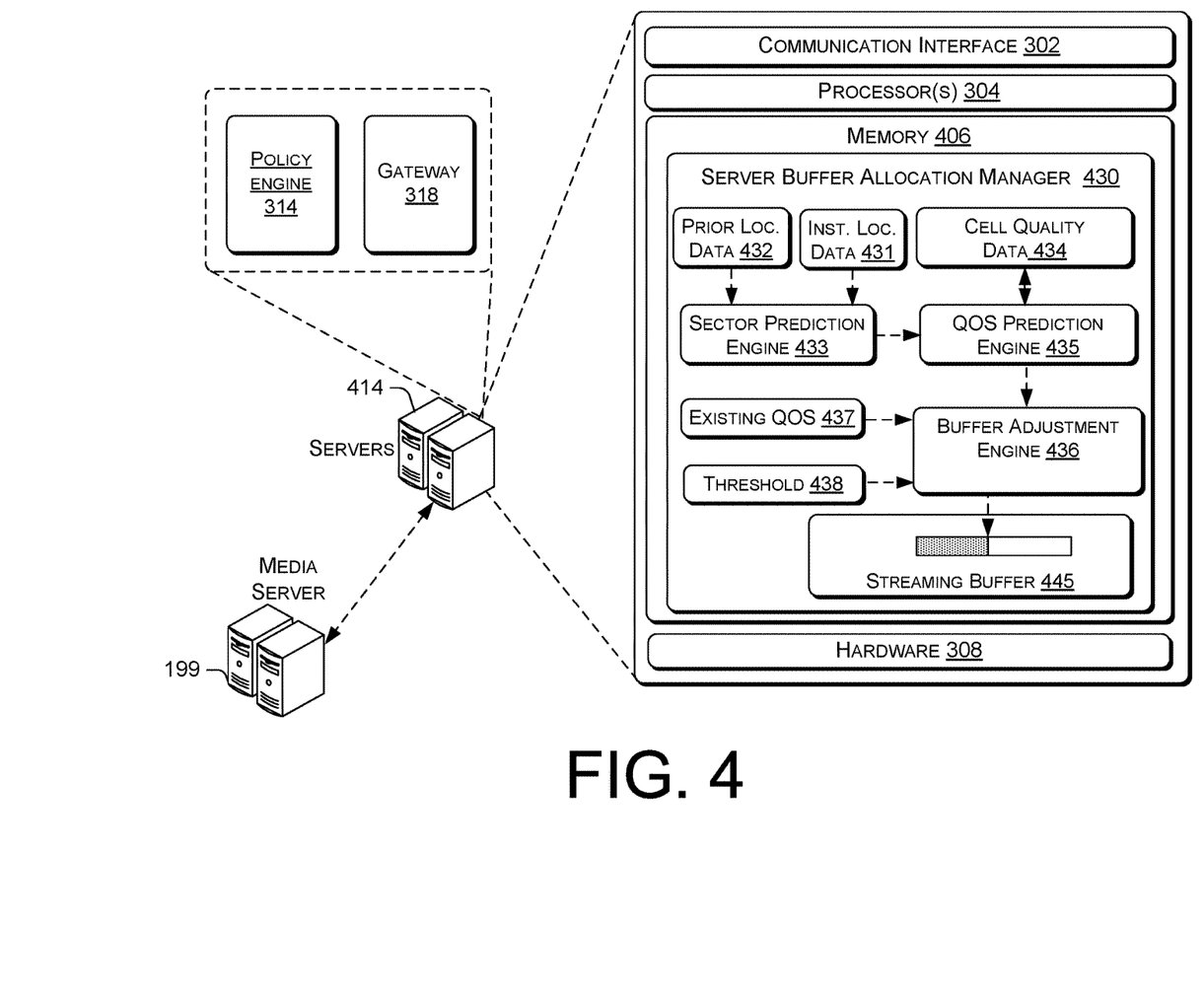
FIG. 4 is a block diagram showing various components of an example server within a carrier network that is configured to adjust a buffer allocation based at least in part on a predicted quality of service of a predicted future sector that the user device will encounter.

FIG. 4 is a block diagram showing various components of an example server(s) 414 within a carrier network 102 configured to adjust a buffer allocation based at least in part on a predicted quality of service of a predicted future sector that the user device will encounter. As previously described, FIG. 4 shows a server-side embodiment where the buffer allocation of streaming buffer 445 is dynamically adjusted based on operations and/or analysis performed in large part by server(s) 414 in carrier network 102. This may save battery life of user device 104/204 and/or be a more efficient use of network resources. For example, the size of the streaming buffer 445 could be transmitted to user device 104/204 over the carrier network and the user device 204 could manage the stream of media content based on the size of the streaming buffer 445 calculated by server(s) 414.

In FIG. 4, server(s) 414 may include communication interface 302, one or more processors 304, memory 406, and hardware 308. The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In various embodiments, the processors 304 and the memory 406 of the server(s) 414 may execute policy engine 314, gateway 318, as well as other components of the core network 106. Server(s) 414 may have access to media servers 199 to provide streaming content to user devices 104/204.

Memory 410 includes server buffer allocation manager 430. In the illustrated embodiment, server buffer allocation manager 430 includes prior device location data 432, instant device location data 431, sector prediction engine 433, cell quality data 434, a QOS Prediction Engine 435, Existing QOS data 437, threshold data 438, buffer adjustment engine 436, and streaming buffer 445. In FIG. 4, the calculation of the streaming buffer is performed by the server(s) 414.

Prior device location data 432 may include locations of the user device 104/204 and the times that the user device was at the locations. Server buffer allocation manager 430 may receive locations and/or corresponding time stamps from the user devices. The locations may be derived from GPS sensors or compasses of sensors 204 of the user device 204. Prior device location data 432 may include hundreds or thousands of prior device locations with corresponding times. In an embodiment, the prior device location data 432 includes at least a first pairing and a second pairing, where the first pairing including a first location and a first time that a device was at the first location and the second pairing including a second location and second time that the device was at the second location.

Instant device location data 431 may include the instant location (and time) of a user device, such as user device 204. Server Buffer Allocation Manager 430 may have to request the instant device location data 431 from user device 204 prior to calculating a size of streaming buffer 445. The instant location of the user device may be derived from a GPS sensor of the user device 204 or a Wi-Fi signal that is received by the user device that can be mapped to a location, for example.

Sector prediction engine 433 is coupled to receive prior device location data 432 and instant device location data 431 and provide predicted sector data to QOS prediction engine 435 based at least in part on the prior device location data 432 and the instant device location data 431. QOS prediction engine 435 receives the sector prediction data from sector prediction engine 433, in the illustrated embodiment. Using the sector prediction data, the QOS prediction engine 435 may query cell quality data 434 to receive a quality of service metric data for a "cell" that provides wireless coverage to the future sector predicted by the sector prediction engine 433. Based on the sector prediction data and the quality of service metric, QOS prediction engine 435 may determine a predicted quality of service of wireless communications from wireless carrier network 102 in the future sector and pass the predicted quality of service to buffer adjustment engine 436.

In FIG. 4, buffer adjustment engine 436 receives existing QOS data 437, threshold level of service quality 438, and the predicted quality of service from sector prediction engine 433. The existing QOS data 437 may be determined by receiving QOS data from user device 204 as measured by wireless radio 212.

In one embodiment, buffer adjustment engine 436 adjusts the streaming buffer 445 based at least in part on the predicted quality of service of the wireless communication from the wireless carrier network in the future sector. When the streaming buffer 445 is adjusted, the size of streaming buffer 445 may be communicated to user device 104/204.

In one embodiment, the buffer adjustment engine 436 increases streaming buffer 445 by an additional buffer allocation when the predicted quality of service of the wireless communication from the wireless carrier network in the future sector is below the threshold level of service quality 438 and the existing QOS from the wireless carrier network is above the threshold level of service quality 438.

Figure 5:
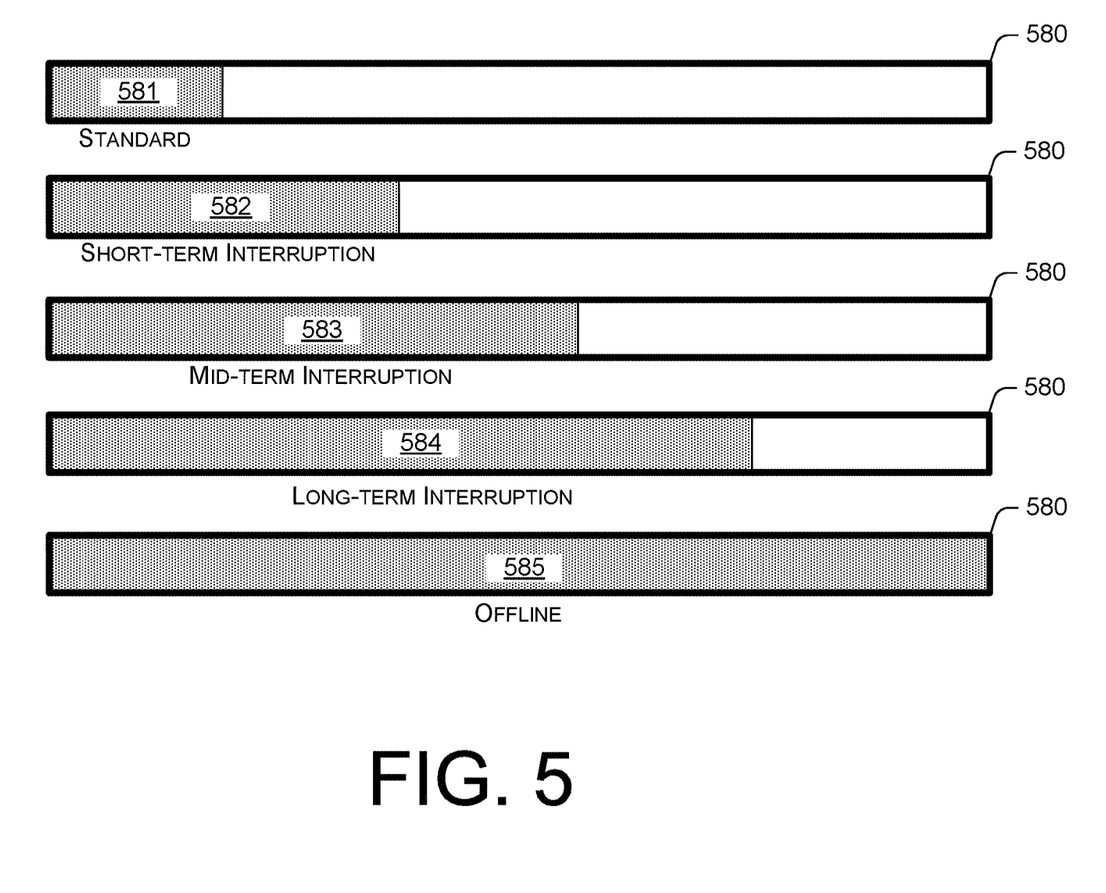
FIG. 5 illustrates example buffer allocations as they relate to predicted data interruptions from a carrier network.

FIG. 5 illustrates example buffer allocations as they relate to predicted data interruptions from a carrier network. A standard buffer allocation 581 of streaming buffer 580 may be 40 megabytes in a streaming video context, for example. The illustrated buffer allocations and streaming buffer 580 of FIG. 5 may be applicable to buffer allocations 175, 177, 179 and streaming buffers 245 and 445. While a predicted quality of service in a predicted future sector is satisfactory (e.g., above a given threshold), the standard buffer allocation 581 is assigned to streaming buffer 580 in FIG. 5. It is understood by those skilled in the art that the "standard" buffer allocations may differ depending on the category of media being streamed. For example, the standard buffer allocation may be larger for video streaming than it would be for audio streaming.

If a short-term interruption is predicted (based on QOS service of predicted future sector or predicted future sectors), the buffer allocation of streaming buffer 580 may be increased to a short-term interruption allocation size 582. If a mid-term interruption is predicted (based on QOS service of predicted future sector or predicted future sectors), the buffer allocation of streaming buffer 580 may be increased to a mid-term interruption allocation size 583. Similarly, if a long-term interruption is predicted (based on QOS service of predicted future sector or predicted future sectors), the buffer allocation of streaming buffer 580 may be increased to a long-term interruption allocation size 584. Finally, if a total absence of coverage is predicted, (based on QOS service of predicted future sector or predicted future sectors), the buffer allocation of streaming buffer 580 may be increased to an offline allocation size 585.

Figure 7:
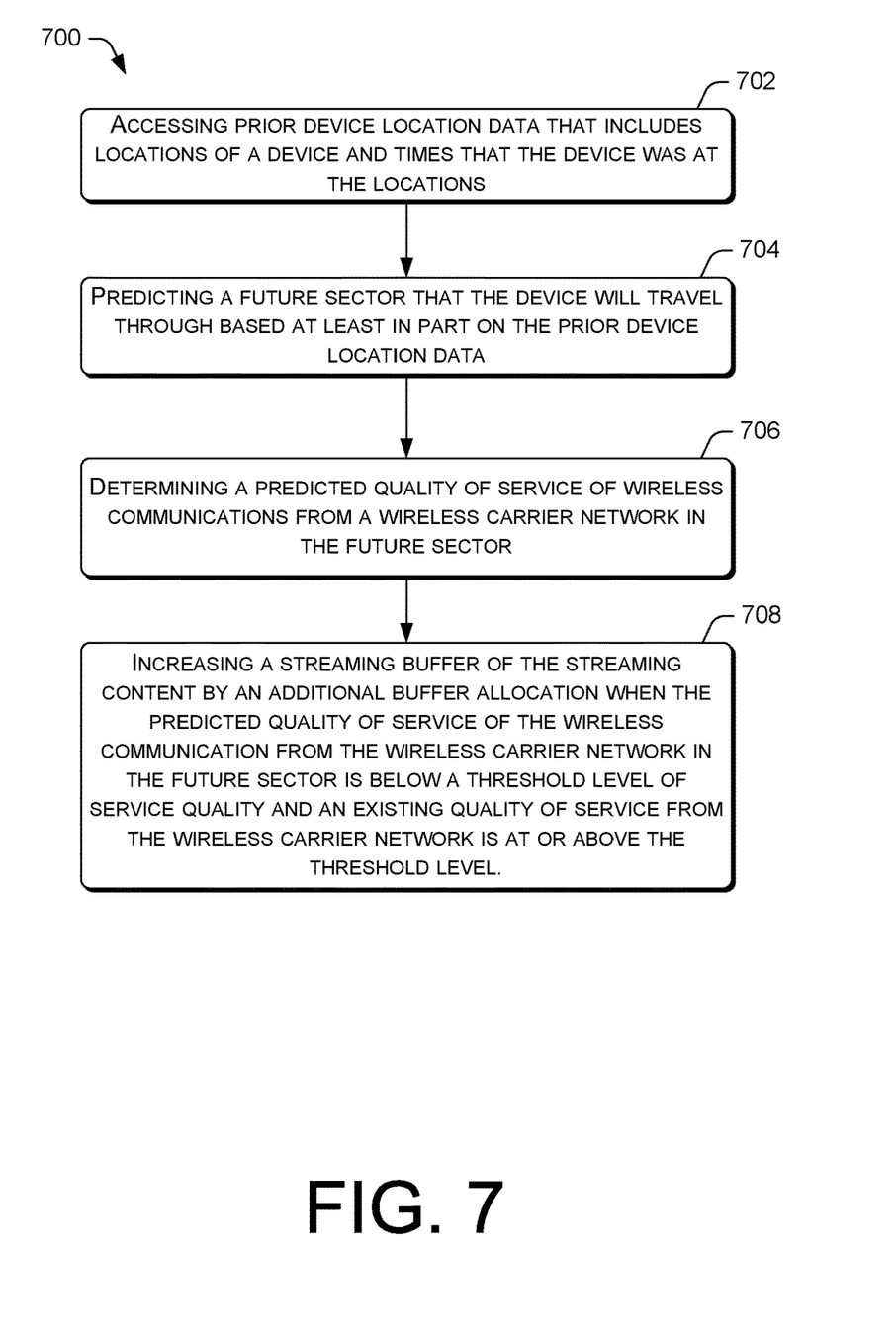
FIG. 7 is a flow diagram of an example process for adjusting a buffer allocation based at least in part on a predicted quality of service of a predicted future sector that the user device will encounter.

FIG. 7 is a flow diagram of an example process 700 for adjusting a buffer allocation based at least in part on a predicted quality of service of a predicted future sector that the user device will encounter. Process 700 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in mirror to implement the process.

In block 702, prior device location data (e.g., 232 or 432) is accessed. The prior device location data may include locations and times that the device was at the locations.

In block 704, a future sector that the device will travel through is predicted based at least in part on the prior device location data.

In block 706, a predicted quality of service of wireless communications from a wireless carrier network in the future sector is determined.

In block 708, a streaming buffer of the streaming content is increased by an additional buffer allocation when the predicted quality of service of the wireless communication from the wireless carrier network in the future sector is below a threshold level of service quality and an existing quality of service from the wireless carrier network is at or above the threshold level.

In one embodiment, when the predicted quality of service of the wireless communication in the future sector is below the threshold level of service quality and the existing quality of service is above the threshold, process 700 may further include buffering additional streaming data of the streaming content into the additional buffer allocation and wirelessly streaming the additional streaming data from a wireless carrier network to the device before the device enters the future sector. The additional streaming data may be accessed from media servers 199 by carrier network 102, for example.

In one embodiment, process 700 includes accessing a cell quality data set (e.g., 234) where the cell quality data set includes quality of service metric data for cells in the wireless carrier network, predicting a wireless interruption time from the wireless carrier network based at least in part on the cell quality data set, and adjusting the additional buffer allocation based on the predicted wireless interruption time.

In one embodiment, process 700 includes measuring, with the device, KPIs of cells in the wireless carrier network that communicated with the device and populating a cell quality data set (e.g., 232) with the KPIs. Hence, in one embodiment, the cell quality data set may be generated by the device itself. In another embodiment, the cell quality data set is received (at least in part) from a server within carrier network 102. The cell quality data set may include KPIs of particular cells in the wireless carrier network, measurement times of the KPIs, and a cell identifier that identifies the cell for which the KPIs was measured. Determining the predicted quality of service of the future sector may include querying the cell quality data set for the KPIs associated with the cells in the wireless carrier network that has wireless coverage in the future sector.

In one embodiment, determining the predicted quality of service of the future sector further includes querying, by the device, a cell quality data set stored on the device and requesting augmented cell data from the wireless carrier network when omitted cells of the wireless carrier network that cover the future sector are omitted from the cell quality data set stored on the device. Omitted cells may be cells that the user device has not logged KPIs for or does not have KPIs for the omitted cells stored locally on the user device. Process 700 may further include receiving augmented cell data from the wireless carrier network where the augmented cell data includes KPIs of the omitted cells. Process 700 may further include augmenting the cell quality data set with augmented cell data.

As described above, the buffer allocation of a streaming buffer may be increased in order to prevent a streaming disruption when a future sector is predicted to have problematic wireless coverage. Additionally, the buffer allocation may subsequently be decreased when a future sector is predicted to have satisfactory wireless coverage as utilizing oversized streaming buffers when coverage is satisfactory is inefficient when a user is changing the streaming content (e.g., skipping a song in audio media or fast-forwarding video media). In one embodiment, process 700 further includes receiving additional device location data that includes at least a subsequent location and a subsequent time that the device was at the subsequent location where the subsequent time is subsequent to the times of the prior device location data. A second predicted quality of service is predicted in a second future sector subsequent to determining the predicted quality of service in the future sector and the streaming buffer of the streaming content is decreased by a second buffer allocation when the second predicted quality of service in the second future sector is above a second threshold level of service quality.

In one embodiment, determining the predicted quality of service of wireless communication from the wireless carrier network in the future sector includes sending a query to a cell quality data set and receiving a query response from the cell quality data set. Time-of-day data may be included in the query. The cell quality data set may include quality of service metric data for cells in the wireless carrier network. The query response may include the quality of service metric data for a cell in the future sector and the quality of service metric data for the cell is specific to historical time-of-day quality of service for the cell. In this way, the prediction of the QOS of wireless communication in a future sector can be specific to a time of day. For example, during rush hour traffic, the quality of service along a highway may be poor because of network congestion, whereas during midday, the QOS is satisfactory.

In one embodiment, the prior device location data includes at least a first pairing and a second pairing where the first pairing includes a first location and a first time that the device was at the first location and the second pairing includes a second location and a second time that the device was at the second location. In one embodiment, the streaming content includes at least one of video content or audio content.

In one embodiment, a mobile device includes a cellular data communication interface, processing logic, and a memory. The cellular data communication interface may include an antenna to facilitate cellular communication with a wireless carrier network. The processing logic may be coupled to the cellular data communication interface and the memory may be coupled to the processing logic. The term "processing logic" in this disclosure may include one or more processors, microprocessors, multi-core processors, and/or Field Programmable Gate Arrays (FPGAs) to execute operations disclosed herein. In some embodiments, memories (not illustrated) are integrated into the processing logic to store instructions to execute operations and/or store data. Processing logic may include analog or digital circuitry to perform the operations disclosed herein. A memory" or "memories" described in this disclosure may include volatile or non-volatile memory architectures.

The memory of the mobile device may include instructions that, when executed, cause the mobile device to perform operations including accessing prior device location data that includes locations of the mobile device and times that the mobile device was at the locations. Further operations may include predicting a future sector that the mobile device will travel through based at least in part on the prior device location data, determining a predicted quality of service of wireless communications from the wireless carrier network in the future sector, and measuring with the mobile device an existing quality of service from the wireless carrier network. locations of the mobile device and times that the mobile device was at the locations. The streaming buffer of the mobile device may be increased by an additional buffer allocation when the predicted quality of service of the wireless communication from the wireless carrier network in the future sector is below a threshold level of service quality and the existing quality of service from the wireless carrier network is at or above the threshold level.

In one embodiment, the memory of the mobile device further includes instructions that when executed by the mobile device include accessing a cell quality data stored in the memory, predicting a wireless interruption time, and transmitting a buffer adjustment request to the wireless carrier network based on the predicted wireless interruption time. The cell quality data set may include quality of service metric data for cells in the wireless carrier network. The wireless interruption time may be predicted based at least in part on the cell quality data set.

In one embodiment, when the predicted quality of service of the wireless communication in the future sector is below the threshold level of service quality and the existing quality of service is above the threshold level, the memory of the mobile device includes further instruction that, when executed, cause the mobile device to perform further operations including receiving addition streaming data of streaming content into the additional buffer allocation of the streaming buffer. The additional streaming data may be received from the wireless carrier network (e.g., network 102). Therefore, once the streaming buffer allocation is increased, the additional buffer allocation may be filled with additional streaming data from a wireless carrier network that has access to the streaming media.

In one embodiment, increasing the streaming buffer of the streaming content includes transmitting a buffer increase request to the wireless carrier network.

As described with respect to FIG. 4, one or more computing devices on a wireless carrier network may perform a significant amount of processing in some embodiments. In one embodiment, one or more computing devices of the wireless carrier network includes one or more processors and memory having stored instructions that when executed by the one or more processors, cause the one or more processors to perform operations including: accessing prior device location data that includes locations of a device and times the device was at the locations; predicting a future sector that the device will travel through based at least in part on the prior device location data; determining a predicted quality of service of wireless communications from the wireless carrier network in the future sector; receiving, from the device, an existing quality of service from the wireless carrier network; and adjusting a streaming buffer of streaming content based at least in part on the predicted quality of service of the wireless communication from the wireless carrier network in the future sector.

In one embodiment, adjusting the streaming buffer of the streaming content includes increasing the streaming buffer of the mobile device by an additional buffer allocation when the predicted quality of service of the wireless communication from the wireless carrier network in the future sector is below a threshold level of service quality and the existing quality of service from the wireless carrier network is above the threshold level.

In one embodiment, adjusting the streaming buffer of the streaming content includes decreasing the streaming buffer of the streaming content by a buffer allocation when the predicted quality of service in the future sector is above the existing quality of service.

In one embodiment, the prior device location data is sent to the one or more computing devices by the device and the prior device location data includes a first prior cell identifier representing a first prior cell that provided the wireless communication to the device at a first time and a second prior cell identifier representing a second prior cell that provided the wireless communication to the device at a second time prior to the first time.

In one embodiment, determining the predicted quality of service of the wireless communications from the wireless carrier network further includes: receiving, from the device, an existing cell identifier representative of the existing cell that provides the existing quality of service to the device; accessing key performance indicators (KPIs) of neighbor cells of the wireless carrier network that are neighbors to the existing cell, wherein the neighbor cells provide wireless data coverage in the future sector; and generating the predicted quality of service based at least in part on the KPIs of the neighbor cells.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method of buffering streaming content, the computer-implemented method comprising:
   accessing prior device location data including locations of a device and times that the device was at the locations;
   determining an existing quality of service of wireless communications from a wireless carrier network in an existing sector;
   predicting a future sector that the device will travel through based at least in part on the prior device location data;
   determining a predicted quality of service of wireless communications from the wireless carrier network in the future sector, wherein the predicted quality of service is specific to a time of day in the future sector, and wherein determining the predicted quality of service comprises:
      sending a query to a cell quality data set, wherein the query includes time-of-day data; and
      receiving a query response from the cell quality data set, wherein the query response includes a quality of service metric data for a cell in the future sector and wherein the quality of service metric data for the cell in the future sector is specific to a historical time-of-day quality of service for the cell in the future sector corresponding to the time of day;
   receiving a first threshold level of service quality;
   increasing a streaming buffer of streaming content by an additional buffer allocation while the device has access to the existing quality of service only when both: (1) the predicted quality of service of the wireless communication from the wireless carrier network in the future sector is below the first threshold level of service quality and, (2) the existing quality of service from the wireless carrier network is above the first threshold level of service quality;
   receiving a second threshold level of service quality that is greater than the first threshold level of service quality; and
   maintaining the streaming buffer of the streaming content when the predicted quality of service of the wireless communication from the wireless carrier network in the future sector is at the first threshold level of service quality and the existing quality of service from the wireless carrier network is at the second threshold level of service quality without predicted disruption in streaming service while the device has access to the existing quality of service and the predicted quality of service.

2. The computer-implemented method of claim 1, wherein when the predicted quality of service of the wireless communication in the future sector is below the first threshold level of service quality and the existing quality of service is above the first threshold level of service quality, the computer-implemented method further comprises:
   buffering additional streaming data of the streaming content into the additional buffer allocation; and
   wirelessly streaming the additional streaming data from a wireless carrier network to the device before the device enters the future sector.

3. The computer-implemented method of claim 1, further comprising:
   accessing the cell quality data set, wherein the cell quality data set includes quality of service metric data for cells in the wireless carrier network;
   predicting a wireless interruption time from the wireless carrier network based at least in part on the cell quality data set; and
   adjusting the additional buffer allocation based on the predicted wireless interruption time.

4. The computer-implemented method of claim 1, further comprising:
   measuring, with the device, key performance indicators (KPIs) of cells in the wireless carrier network that communicated with the device; and
   populating the cell quality data set with the KPIs, wherein the cell quality data set includes KPIs of particular cells in the wireless carrier network, measurement times of the KPIs, and a cell identifier that identifies the cell for which the KPIs was measured.

5. The computer-implemented method of claim 4, wherein determining the predicted quality of service of the future sector includes querying the cell quality data set for the KPIs associated with the cells in the wireless carrier network that have wireless coverage in the future sector.

6. The computer-implemented method of claim 1, wherein determining the predicted quality of service of the future sector further includes:
   querying, by the device, the cell quality data set stored on the device, wherein the cell quality data set includes quality of service metric data for cells in the wireless carrier network;
   requesting augmented cell data from the wireless carrier network when omitted cells of the wireless carrier network that cover the future sector are omitted from the cell quality data set stored on the device;
   receiving the augmented cell data from the wireless carrier network, wherein the augmented cell data includes key performance indicators (KPIs) of the omitted cells; and
   augmenting the cell quality data set with the augmented cell data.

7. The computer-implemented method of claim 1 further comprising:
   receiving additional device location data that includes at least a subsequent location and a subsequent time that the device was at the subsequent location, wherein the subsequent time is subsequent to the times of the prior device location data;
   determining a second predicted quality of service in a second future sector subsequent to determining the predicted quality of service in the future sector; and
   decreasing the streaming buffer of the streaming content by a second buffer allocation when the second predicted quality of service in the second future sector is above the existing quality of service.

8. The computer-implemented method of claim 1, wherein the prior device location data includes at least a first pairing and a second pairing, the first pairing including a first location and a first time that a device was at the first location and the second pairing including a second location and second time that the device was at the second location.

9. The computer-implemented method of claim 1, wherein the streaming content includes at least one of video content or audio content.

10. A mobile device including:
a cellular data communication interface including an antenna to facilitate cellular communication with a wireless carrier network;
processing logic coupled to the cellular data communication interface; and
a memory coupled to the processing logic, wherein the memory includes instructions that, when executed, cause the mobile device to perform operations comprising:
accessing prior device location data that includes locations of the mobile device and times that the mobile device was at the locations;
predicting a future sector that the mobile device will travel through based at least in part on the prior device location data;
determining a predicted quality of service of wireless communications from the wireless carrier network in the future sector, wherein the predicted quality of service is specific to a time of day in the future sector, and wherein determining the predicted quality of service comprises:
sending a query to a cell quality data set, wherein the query includes time-of-day data; and
receiving a query response from the cell quality data set, wherein the query response includes a quality of service metric data for a cell in the future sector and wherein the quality of service metric data for the cell in the future sector is specific to a historical time-of-day quality of service for the cell in the future sector corresponding to the time of day;
measuring, with the mobile device, an existing quality of service of wireless communications from the wireless carrier network in an existing sector;
receiving a first threshold level of service quality;
increasing a streaming buffer of streaming content of the mobile device by an additional buffer allocation while the mobile device has access to the existing quality of service only when both: (1) the predicted quality of service of the wireless communication from the wireless carrier network in the future sector is below the first threshold level of service quality and, (2) the existing quality of service from the wireless carrier network is above the first threshold level of service quality;
receiving a second threshold level of service quality that is greater than the first threshold level of service quality; and
maintaining the streaming buffer of the streaming content when the predicted quality of service of the wireless communication from the wireless carrier network in the future sector is at the first threshold level of service quality and the existing quality of service from the wireless carrier network is at the second threshold level of service quality without predicted disruption in streaming service while the device has access to the existing quality of service and the predicted quality of service.

11. The mobile device of claim 10, wherein the memory includes further instructions that, when executed, cause the mobile device to perform further operations comprising:
accessing the cell quality data set stored in the memory, wherein the cell quality data set includes quality of service metric data for cells in the wireless carrier network;
predicting a wireless interruption time from the wireless carrier network based at least in part on the cell quality data set; and
transmitting a buffer adjustment request to the wireless carrier network based on the predicted wireless interruption time.

12. The mobile device of claim 10, wherein when the predicted quality of service of the wireless communication in the future sector is below the first threshold level of service quality and the existing quality of service is above the first threshold level, the memory includes further instructions that, when executed, cause the mobile device to perform further operations comprising:
receiving additional streaming data of streaming content into the additional buffer allocation of the streaming buffer, wherein the additional streaming data is received from a wireless carrier network.

13. The mobile device of claim 10, wherein increasing the streaming buffer of the streaming content includes transmitting a buffer increase request to the wireless carrier network.

14. The mobile device of claim 10, wherein the memory includes further instructions that, when executed, cause the mobile device to perform further operations comprising:
receiving additional device location data that includes at least a subsequent location and a subsequent time that the device was at the subsequent location, wherein the subsequent time is subsequent to the times of the prior device location data;
determining a second predicted quality of service in a second future sector subsequent to determining the predicted quality of service in the future sector; and
decreasing the streaming buffer of the streaming content by a second buffer allocation when the second predicted quality of service in the second future sector is above the existing quality of service.

15. One or more computing devices on a wireless carrier network comprising:
one or more processors; and
memory having instructions stored therein, the instructions, when executed by the one or more processors, cause the one or more processors to perform operations comprising:
accessing prior device location data that includes locations of a device and times that the device was at the locations;
predicting a future sector that the device will travel through based at least in part on the prior device location data;
determining a predicted quality of service of wireless communications from the wireless carrier network in the future sector, wherein the predicted quality of service is specific to a time of day in the future sector, and wherein determining the predicted quality of service comprises:
sending a query to a cell quality data set, wherein the query includes time-of-day data; and
receiving a query response from the cell quality data set, wherein the query response includes a quality of service metric data for a cell in the future sector and wherein the quality of service metric data for the cell in the future sector is specific to a historical time-of-day quality of service for the cell in the future sector corresponding to the time of day;

receiving, from the device, an existing quality of service of wireless communications from the wireless carrier network in an existing sector;
receiving a first threshold level of service quality;
adjusting a streaming buffer of streaming content based at least in part on the predicted quality of service of the wireless communication from the wireless carrier network in the future sector, wherein adjusting the streaming buffer of the streaming content includes increasing the streaming buffer of the streaming content by an additional buffer allocation while the device has access to the existing quality of service only when both: (1) the predicted quality of service of the wireless communication from the wireless carrier network in the future sector is below the first threshold level of service quality and, (2) the existing quality of service from the wireless carrier network is above the first threshold level of service quality;
receiving a second threshold level of service quality that is greater than the first threshold level of service quality;
maintaining the streaming buffer of the streaming content when the predicted quality of service of the wireless communication from the wireless carrier network in the future sector is at the first threshold level of service quality and the existing quality of service from the wireless carrier network is at the second threshold level of service quality without predicted disruption in streaming service while the device has access to the existing quality of service and the predicted quality of service.

16. The one or more computing devices of claim 15, wherein determining predicted quality of service of the wireless communications from the wireless carrier network further includes:
receiving, from the device, an existing cell identifier representative of the existing cell that provides the existing quality of service to the device;
accessing key performance indicators (KPIs) of neighbor cells of the wireless carrier network that are neighbors to the existing cell, wherein the neighbor cells provide wireless data coverage in the future sector; and
generating the predicted quality of service based at least in part on the KPIs of the neighbor cells.

17. The one or more computing devices of claim 15, wherein the prior device location data is sent to the one or more computing devices by the device, and wherein the prior device location data includes a first prior cell identifier representing a first prior cell that provided the wireless communication to the device at a first time and a second prior cell identifier representing a second prior cell that provided the wireless communication to the device at a second time prior to the first time.

18. The one or more computing devices of claim 15, wherein adjusting the streaming buffer of the streaming content includes decreasing the streaming buffer of the streaming content by a buffer allocation when the predicted quality of service in the future sector is above the existing quality of service.

* * * * *